(No Model.)

J. B. RUTHERFORD.
WATER WHEEL.

No. 260,611. Patented July 4, 1882.

WITNESSES
W. H. Knight
H. Bernhard

John B. Rutherford
INVENTOR
By Edson Bros
Attorneys

UNITED STATES PATENT OFFICE.

JOHN B. RUTHERFORD, OF NETAWAKA, KANSAS.

WATER-WHEEL.

SPECIFICATION forming part of Letters Patent No. 260,611, dated July 4, 1882.

Application filed April 15, 1882. (No model.)

*To all whom it may concern:*

Be it known that I, JOHN B. RUTHERFORD, a citizen of the United States, residing at Netawaka, in the county of Jackson and State of Kansas, have invented certain new and useful Improvements in Water-Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1:
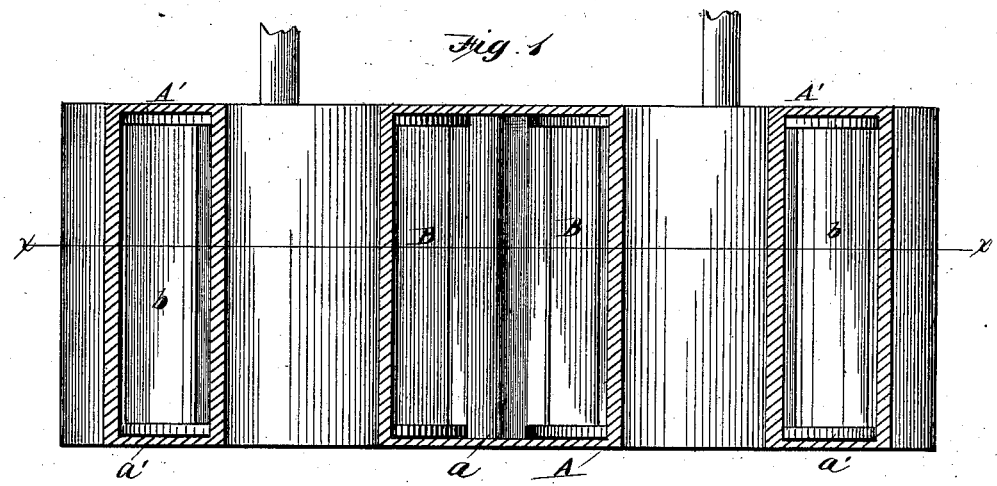
Figure 2:
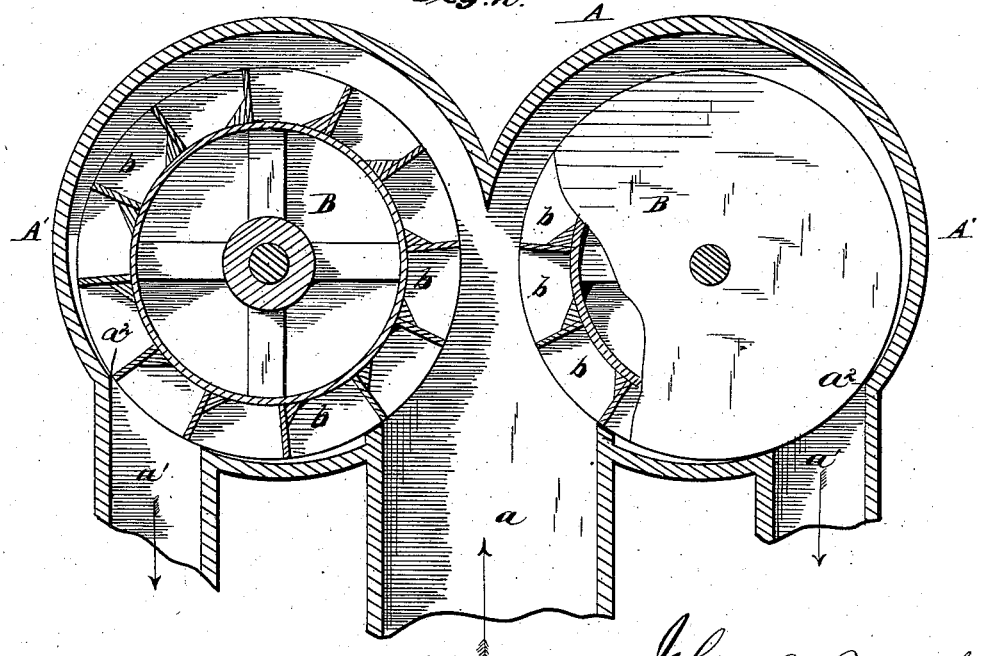

Figure 1 is a side view of my improved water-wheel. Fig. 2 is a horizontal section on the line $x\ x$ of Fig. 1.

This invention relates to an improvement in water-wheels, having for its object to fully utilize the force of the water; and it consists of two cylinders, each hung eccentrically in each of two cylinders of a casing or inclosure, and both fed through a common supply pipe or opening, and discharging at outer distant points of the circumferences of the casing, substantially as hereinafter more fully set forth and claimed.

In carrying out my invention I employ, as observed by reference to the accompanying drawings, a casing, A, consisting of two cylindrical compartments, A' A', arranged with their peripheries touching each other. A section is taken out of the peripheries of each cylinder, near their point of union, to provide an opening, which is fitted with a common supply pipe or neck, $a$, to admit the water upon the cylinders within the casing. The water is discharged at distant points $a'$ in the circumferences of the double-cylinder casing A.

B B are the cylinders, each hung eccentrically in each of the compartments A' of the casing A, so that its periphery will nearly touch the coincident surface of its compartment just before discharging its water, as shown at $a^2$. This impels the cylinder or wheel with accelerated force immediately prior to its discharge of the water, and where the water ceases to act at that point upon the wheel or cylinder by narrowing the passage of the water. The wheels or cylinders B are provided with buckets $b$, whose outer edges are arranged at a point within the circumferences of the wheels.

It will be observed that the water has a surface of contact upon each of the cylinders equal to or covering more than two-thirds the area of each cylinder or compartment, thus fully utilizing the force of the water from its entrance to time of discharge, aided by the accelerated force obtained by narrowing the water-passage just before the delivery of the water.

I claim and desire to secure by Letters Patent—

The cylinders or wheels combined with and each eccentrically hung in each of two compartments of a double-cylinder casing, having a common supply-pipe, and discharge-openings arranged at distant points in the circumferences of the said compartments, substantially as and for the purpose specified.

In testimony whereof I affix my signature in presence of two witnesses.

JOHN B. RUTHERFORD.

Witnesses:
S. E. GRAVES,
J. S. GOODRICH.